United States Patent
Okuda et al.

(10) Patent No.: US 11,897,328 B2
(45) Date of Patent: Feb. 13, 2024

(54) ELECTRIC DRIVE APPARATUS FOR VEHICLE

(71) Applicant: TOYOTA JIDOSHA KABUSHIKI KAISHA, Aichi-ken (JP)

(72) Inventors: Koichi Okuda, Toyota (JP); Naoki Itazu, Nagoya (JP); Satoshi Kasamai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/082,858

(22) Filed: Dec. 16, 2022

(65) Prior Publication Data

US 2023/0191905 A1 Jun. 22, 2023

(30) Foreign Application Priority Data

Dec. 21, 2021 (JP) .................. 2021-207566

(51) Int. Cl.
*B60K 17/10* (2006.01)
*B60K 17/02* (2006.01)
(Continued)

(52) U.S. Cl.
CPC ............ *B60K 17/105* (2013.01); *B60K 17/02* (2013.01); *B60K 17/12* (2013.01); *B60K 6/383* (2013.01);
(Continued)

(58) Field of Classification Search
CPC ...... B60K 17/105; B60K 17/02; B60K 17/12; B60K 37/65; B60K 2006/266; B60K 2007/0061; B60K 6/383; B60K 6/48–547; F16H 1/06; F16H 2003/0803; F16H 2003/0826; F16H 31/001; F16H 48/16; F16H 2048/202; F16H 2048/02; F16H 2200/2069; F16H 27/04; F16H 3/091–3/126; F06C 2/10; B60Y 2400/78
See application file for complete search history.

(56) References Cited

U.S. PATENT DOCUMENTS

| 2008/0261740 A1* | 10/2008 | Shimizu ................... B60K 6/26 475/5 |
| 2009/0233749 A1* | 9/2009 | Tomita ................... B60K 6/365 475/159 |
| 2019/0017588 A1 | 1/2019 | Kawai et al. |

FOREIGN PATENT DOCUMENTS

| JP | 2011-106543 A | 6/2011 |
| JP | 2013-116701 A | 6/2013 |

(Continued)

*Primary Examiner* — Tinh Dang
(74) *Attorney, Agent, or Firm* — Sughrue Mion, PLLC (57) ABSTRACT

A vehicle electric drive apparatus is provided with a single hydraulic pump and left-side and right-side drive units. The left-side drive unit includes a left-side electric motor and a left-side transmission mechanism. The right-side drive unit includes a right-side electric motor and a right-side transmission mechanism. One of rotary shafts of the left-side transmission mechanism and one of rotary shafts of the right-side transmission mechanism constitute a pair of pump-drive rotary shafts. The single hydraulic pump is connected to the pair of pump-drive rotary shafts through respective one-way clutches, and is to be driven by one of the pump-drive rotary shafts that is rotated at a speed higher than the other of the pump-drive rotary shafts, so as to output a hydraulic pressure.

6 Claims, 4 Drawing Sheets

(51) Int. Cl.

| | |
|---|---|
| *B60K 17/12* | (2006.01) |
| *B60K 6/383* | (2007.10) |
| *B60K 6/26* | (2007.10) |
| *B60K 7/00* | (2006.01) |
| *F16H 1/06* | (2006.01) |
| *F16H 37/06* | (2006.01) |
| *F16H 48/16* | (2006.01) |
| *F16H 57/04* | (2010.01) |
| *F04C 2/10* | (2006.01) |
| *B60K 25/00* | (2006.01) |
| *F16H 31/00* | (2006.01) |

(52) U.S. Cl.
CPC ............... *B60K 2006/266* (2013.01); *B60K 2007/0061* (2013.01); *F04C 2/10* (2013.01); *F16H 1/06* (2013.01); *F16H 31/001* (2013.01); *F16H 37/065* (2013.01); *F16H 48/16* (2013.01); *F16H 2200/2069* (2013.01)

(56) References Cited

FOREIGN PATENT DOCUMENTS

| JP | 2016-148411 A | 8/2016 |
|---|---|---|
| JP | 2017-115980 A | 6/2017 |
| JP | 2017-133526 A | 8/2017 |

\* cited by examiner

ELECTRIC DRIVE APPARATUS FOR VEHICLE

This application claims priority from Japanese Patent Application No. 2021-207566 filed on Dec. 21, 2021, the disclosure of which is herein incorporated by reference in its entirety.

FIELD OF THE INVENTION

The present invention relates to an electric drive apparatus for a vehicle, and more particularly, to an electric drive apparatus for a vehicle, wherein the electric drive apparatus includes a left-side drive unit configured to drive a left wheel of the vehicle and a right-side drive unit configured to drive a right wheel of the vehicle.

BACKGROUND OF THE INVENTION

There is proposed an electric drive apparatus for a vehicle, wherein the electric drive apparatus includes (a) a left-side drive unit configured to drive a left wheel of the vehicle, and including (a-1) a left-side electric motor and (a-2) a left-side transmission mechanism including left-side rotary shafts and disposed in a left-side power transmission path between the left-side electric motor and the left wheel, and (b) a right-side drive unit configured to drive a right wheel of the vehicle, and including (b-1) a right-side electric motor and (b-2) a right-side transmission mechanism including right-side rotary shafts and disposed in a right-side power transmission path between the right-side electric motor and the right wheel. JP-2016-148411A and JP-2017-133526A disclose respective apparatuses as examples of such an electric drive apparatus. Each of the disclosed apparatuses is provided with hydraulic pumps configured to output a lubricant fluid for lubricating the transmission mechanisms and cooling the electric motors. Since the left and right wheels are rotated at different speeds upon turning of the vehicle, the hydraulic pumps are provided in respective left-side and right-side drive units. Further, a one-way clutch is provided in each of the hydraulic pumps, so as to reduce a drive loss that could be caused due to drag of the pumps during reverse running of the vehicle. Further, JP-2017-133526A further discloses a technique for providing the hydraulic pump in only one of the left-side and right-side drive units (see FIGS. 10 and 11 of this Japanese Patent Application Publication).

SUMMARY OF THE INVENTION

However, where the hydraulic pumps are provided in the respective left-side and right-side drive units, the apparatus as a whole has an increased size whereby mountability of the apparatus in the vehicle is reduced. Further, where the hydraulic pump is provided in only one of the left-side and right-side drive units, when the one of the left-side and right-side drive units (in which the hydraulic pump is provided) is inside the other of the left-side and right-side drive units upon turning of the vehicle, the hydraulic pump is rotated or driven at a reduced speed so that an amount of lubricant oil supplied from the hydraulic pump could be insufficient. If a large-sized hydraulic pump is employed as the hydraulic pump provided in only one of the left-side and right-side drive units, for avoiding the insufficiency of the amount of the supplied lubricant oil, the lubricant oil could be supplied more than necessary, for example, during straight running of the vehicle, whereby the drive loss could be increased.

The present invention was made in view of the background art described above. It is therefore an object of the present invention to make a hydraulic pump compact in size in an electric drive apparatus for a vehicle, wherein the electric drive apparatus is provided with drive units configured to drive respective left and right wheels.

The object indicated above is achieved according to the following aspects of the present invention.

According to a first aspect of the invention, there is provided an electric drive apparatus for a vehicle. The electric drive apparatus includes: (a) a left-side drive unit configured to drive a left wheel of the vehicle, and including (a-1) a left-side electric motor and (a-2) a left-side transmission mechanism including left-side rotary shafts and disposed in a left-side power transmission path between the left-side electric motor and the left wheel; (b) a right-side drive unit configured to drive a right wheel of the vehicle, and including (b-1) a right-side electric motor and (b-2) a right-side transmission mechanism including right-side rotary shafts and disposed in a right-side power transmission path between the right-side electric motor and the right wheel; and (c) a single hydraulic pump configured to output a hydraulic pressure. One of the left-side rotary shafts and one of the right-side rotary shafts constitute a pair of pump-drive rotary shafts that are to be rotated at respective speeds equal to each other during straight running of the vehicle. The single hydraulic pump is connected to the pair of pump-drive rotary shafts through respective one-way clutches, and is to be driven by one of the pump-drive rotary shafts that is rotated at a speed higher than the other of the pump-drive rotary shafts, so as to output the hydraulic pressure.

According to a second aspect of the invention, in the electric drive apparatus according to the first aspect of the invention, the left-side rotary shafts and the right-side rotary shafts are the same as each other in number, and extend substantially in parallel to a width direction of the vehicle, wherein the left-side transmission mechanism and the right-side transmission mechanism are the same as each other in gear ratio and in number of gears disposed on the rotary shafts, and are symmetrical with each other with respect to a center line in the width direction of the vehicle, wherein each of the left-side rotary shafts and a corresponding one of the right-side rotary shafts are disposed on a common axis, and are to be rotated at respective speeds equal to each other during straight running of the vehicle, wherein the one of the left-side rotary shafts and the one of the right-side rotary shafts, which constitute the pair of pump-drive rotary shafts, are disposed on the common axis, and wherein the single hydraulic pump and the one-way clutches, which are disposed on respective opposite sides of the single hydraulic pump in the width direction of the vehicle, are located between the left-side transmission mechanism and the right-side transmission mechanism in the width direction, and disposed on the same axis as the pair of pump-drive rotary shafts.

According to a third aspect of the invention, in the electric drive apparatus according to the second aspect of the invention, the left-side electric motor and the right-side electric motor are disposed to be spaced apart from each other in a direction of a first axis as the same axis that is substantially parallel to the width direction of the vehicle, and have respective output shafts that are located on the first axis, wherein the left-side transmission mechanism and the right-side transmission mechanism are located between the left-side electric motor and the right-side electric motor in the width direction, wherein the left-side rotary shafts include an input shaft, an intermediate shaft and an output shaft, while the right-side rotary shafts include an input shaft, an intermediate shaft and an output shaft, wherein the gears disposed on the left-side rotary shafts include a drive gear, a large-diameter gear, a small-diameter gear and a driven gear, while the gears disposed on the right-side rotary shafts include a drive gear drive gear, a large-diameter gear, a small-diameter gear and a driven gear, wherein the drive gear is disposed on the input shaft of each of the left-side transmission mechanism and the right-side transmission mechanism, which is located on the first axis, wherein the input shaft of the left-side transmission mechanism is connected to the left-side electric motor in a power transmittable manner while the input shaft of the right-side transmission mechanism is connected to the right-side electric motor in a power transmittable manner, wherein the large-diameter gear and the small-diameter gear are disposed on the intermediate shaft of each of the left-side transmission mechanism and the right-side transmission mechanism, which is located on a second axis parallel to the first axis, such that the large-diameter gear and the small-diameter gear are spaced apart from each other in a direction of the second axis, and such that rotation is transmittable to the large-diameter gear from the drive gear disposed on the input shaft, wherein the driven gear is disposed on the output shaft of each of the left-side transmission mechanism and the right-side transmission mechanism, which is located on a third axis parallel to the first axis, and which is connected to a drive shaft in a power transmittable manner, such that rotation is transmittable to the driven gear from the small-diameter gear disposed on the intermediate shaft, and wherein one of the input shaft and the output shaft of each of the left-side transmission mechanism and the right-side transmission mechanism constitutes a corresponding one of the pair of pump-drive rotary shafts.

According to a fourth aspect of the invention, in the electric drive apparatus according to any one of the first through third aspects of the invention, the one of the left-side rotary shafts, which constitutes one of the pair of pump-drive rotary shafts, is shorter in length than at least one of the other of the left-side rotary shafts, and the one of the right-side rotary shafts, which constitutes the other of the pair of pump-drive rotary shafts, is shorter in length than at least one of the other of the right-side rotary shafts.

According to a fifth aspect of the invention, in the electric drive apparatus according to any one of the first through fourth aspects of the invention, the left-side drive unit and the right-side drive unit are disposed inside a common casing that is provided with a partition wall, such that the left-side transmission mechanism and the right-side transmission mechanism are disposed on respective opposite sides of the partition wall, wherein the single hydraulic pump is fixed to the partition wall such that at least a part of a pump casing of the single hydraulic pump is constituted by the partition wall.

According to a sixth aspect of the invention, in the electric drive apparatus according to any one of the first through fifth aspects of the invention, the single hydraulic pump includes a pump shaft, and is configured to output the hydraulic pressure with the pump shaft being rotated, wherein the one-way clutches are disposed on respective opposite sides of the single hydraulic pump in a width direction of the vehicle, and each of the one-way clutches includes an inner race and an outer race, wherein one of the outer race and the inner race of each of the one-way clutches is connected to a corresponding one of the pair of pump-drive rotary shafts, and wherein the other of the outer race and the inner race of each of the one-way clutches is connected to a corresponding one of axially opposite end portions of the pump shaft, with the corresponding one of the axially opposite end portions of the pump shaft being inserted in a connection hole provided in the other of the outer race and the inner race of the each of the one-way clutches.

In the electric drive apparatus according to any one of the first through sixth aspects of the invention, the single hydraulic pump is connected through the respective one-way clutches to the pair of pump-drive rotary shafts which are constituted by the ones of the respective left-side and right-side rotary shafts and which are to be rotated at respective speeds equal to each other during straight running of the vehicle, such that the single hydraulic pump is to be driven by one of the pump-drive rotary shafts that is rotated at a speed higher than the other of the pump-drive rotary shafts, so as to output the hydraulic pressure. Therefore, even when the left and right wheels are rotated at respective different speeds, for example, upon turning of the vehicle, lubricant oil can be supplied by sufficient amount, and the single hydraulic pump is commonly provided for the left-side and right-side drive units, so that the electric drive apparatus as a whole can be made compact in size whereby mountability of the apparatus in the vehicle is increased.

In the electric drive apparatus according to the second aspect of the invention, the left-side transmission mechanism and the right-side transmission mechanism are symmetrical with each other with respect to the center line in the width direction of the vehicle. Each of the left-side rotary shafts and a corresponding one of the right-side rotary shafts are disposed on a common axis, and are to be rotated at respective speeds equal to each other during straight running of the vehicle. The above-described one of the left-side rotary shafts and the above-described one of the right-side rotary shafts, which constitute the pair of pump-drive rotary shafts, are disposed on the common axis. The single hydraulic pump and the one-way clutches, which are disposed on respective opposite sides of the single hydraulic pump in the width direction of the vehicle, are located between the left-side transmission mechanism and the right-side transmission mechanism in the width direction, and disposed on the same axis as the pair of pump-drive rotary shafts. Thus, even when the left and right wheels are rotated at respective different speeds, the lubricant oil can be supplied appropriately, and the electric drive apparatus as a whole can be advantageously made compact in size.

In the electric drive apparatus according to the third aspect of the invention, each of the left-side and right-side transmission mechanisms includes, as the rotary shafts, three rotary shafts consisting of the input shaft, the intermediate shaft and the output shaft, and includes, as the gears disposed on the rotary shafts, the drive gear, the large-diameter gear, the small-diameter gear and the driven gear. The input shafts located on the first axis or the output shafts located on the third axis constitute the pair of pump-drive rotary shafts, so that the electric drive apparatus can be made further compact in size.

In the electric drive apparatus according to the fourth aspect of the invention, short rotary shafts, which are ones of the rotary shafts of the left-side and right-side transmission mechanisms and which are relatively short in length, constitute the pair of pump-drive rotary shafts. Therefore, for example, with the single hydraulic pump and the pair of one-way clutches being disposed between the short rotary shafts, a dimension of the electric drive apparatus in an axial direction of the short rotary shafts, i.e., in the width direction of the vehicle can be made small.

In the electric drive apparatus according to the fifth aspect of the invention, the left-side and right-side drive units are disposed inside the common casing such that the left-side and right-side transmission mechanisms are disposed on respective opposite sides of the partition wall, wherein the single hydraulic pump is fixed to the partition wall such that at least a part of the pump casing of the single hydraulic pump is constituted by the partition wall. Thus, the dimension of the electric drive apparatus in the width direction of the vehicle can be made small.

In the electric drive apparatus according to the sixth aspect of the invention, the one-way clutches are disposed on respective opposite sides of the single hydraulic pump in the width direction of the vehicle, wherein one of the outer race and the inner race of each of the one-way clutches is connected to a corresponding one of the pair of pump-drive rotary shafts, and wherein the other of the outer race and the inner race of each of the one-way clutches is connected to a corresponding one of the axially opposite end portions of the pump shaft, with the corresponding one of the axially opposite end portions of the pump shaft being axially inserted in the connection hole provided in the other of the outer race and the inner race of the each of the one-way clutches. Thus, the connection of the pump shaft to the one-way clutches can be easily made.

DETAILED DESCRIPTION OF PREFERRED EMBODIMENTS

In the present invention, the electric drive apparatus for a vehicle may be configured to drive and rotate either rear left and right wheels or front left and right wheels of the vehicle. The present invention is applicable also to a front and rear wheel drive vehicle, wherein the front and rear wheels may be driven by two electric drive apparatuses each corresponding to the electric drive apparatus of the invention, or wherein one of the front and rear pairs of wheels may be driven by the electric drive apparatus of the invention while the other of the front and rear pairs of wheels may be driven by a drive apparatus (other than the electric drive apparatus of the invention) including an internal combustion engine such as gasoline engine. Further, the electric drive apparatus of the invention may be a hybrid drive apparatus including an internal combustion engine and an electric motor. The electric motor included as a drive power source in the electric drive apparatus of the invention may be also a motor generator serving as an electric power generator as well as an electric power source.

The left-side and right-side electric motors of the respective left-side and right-side drive units are disposed transversely to be spaced apart from each other in the direction of the first axis as the same axis that is substantially parallel to the width direction of the vehicle, and have the respective output shafts whose axes are located on the first axis, such that the left-side and right-side transmission mechanisms are disposed between the left-side and right-side electric motors. However, the left-side and right-side electric motors may be disposed longitudinally so that the axes of the output shafts are substantially parallel to a longitudinal direction of the vehicle. In this case, rotation of each of the electric motors can be transmitted to a corresponding one of the left-side and right-side transmission mechanisms through bevel gears, hypoid gears or the like. Thus, various modes are possible for attitude of each of the electric motors.

Each of the left-side and right-side transmission mechanisms may include a plurality of rotary shafts and a plurality of gears, for example, and may be constituted by any of various kinds of transmissions such as a planetary gear transmission and a mesh parallel shaft transmission. The gears included in each of the transmission mechanisms are disposed on the rotary shafts. However, in addition to the gears disposed on the rotary shafts, it is possible to employ a gear and/or a carrier of a planetary gear device, for example, which meshes with the gears disposed on the rotary shafts and which are unrotatably fixed to a casing or the like. Each of the transmission mechanisms may be either a speed reducer or a speed increaser having a constant gear ratio, or may be either a step-variable transmission or a forward/reverse switching device having a gear ratio variable depending on operation states of engagement devices (such as clutch and brake) each of which is to be selectively engaged and released. Moreover, each of the transmission mechanisms may be a chain belt or the like. Although each of the left-side rotary shafts of the left-side transmission mechanism and a corresponding one of the right-side rotary shafts of the right-side transmission mechanism are preferably disposed on a common axis, they may be disposed on respective axes different from each other. For example, it is possible arrange the left-side and right-side rotary shafts, for example, such that only the output shafts connected to the respective drive shafts are disposed on a common axis while the other rotary shafts such as the input shafts and the intermediate shafts are disposed on axes that are offset from each other around the common axis of the output shafts. The left-side and right-side transmission mechanisms may be arranged symmetrically with each other with respect to a center line in the vehicle width direction. However, the left-side and right-side transmission mechanisms do not necessarily have to be arranged symmetrically, but may be identically arranged such that the corresponding rotary shafts and the corresponding gears are parallelly offset in the vehicle width direction.

Where the rotary shafts of each of the left-side and right-side transmission mechanisms includes three rotary shafts consisting of the input shaft connected to the electric motor, the intermediate shaft and the output shaft connected to the drive shaft, the rotary shaft may further include at least one another intermediate shaft. Further, the rotary shafts may include only two rotary shafts consisting of the input shaft and the output shaft, without including the intermediate shaft. The input shaft and the output shaft are disposed on respective axes which are different from each other and which are parallel to each other, for example. However, the input shaft and the output shaft may be disposed on a common axis so as to form a double structure or the like. In that case, a planetary gear transmission is advantageously used as each of the transmission mechanisms. Although each of the gears included in the transmission mechanisms is preferably a helical gear having a tooth form generated on a helical path about its axis, it may be a spur gear having a tooth form parallel to its axis.

The single hydraulic pump may be any of various kinds of hydraulic pumps such as an internal gear pump, an external gear pump and a vane pump. Each of the one-way clutches may be any of various kinds of one-way clutches such as a roller-type one-way clutch and a sprag-type one-way clutch. Each of the one-way clutches is disposed to transmit rotation to the hydraulic pump from a corresponding one of the electric motors or a corresponding one of the transmission mechanisms during forward running of the vehicle, and to be idled during reverse running of the vehicle, for example. However, depending on type of use of the vehicle, each of the one-way clutches may be disposed to transmit rotation to the hydraulic pump from a corresponding one of the electric motors or a corresponding one of the transmission mechanisms during reverse running of the vehicle. The hydraulic pump and the one-way clutches are disposed on the same axis as the pump-drive rotary shafts of the respective transmission mechanisms, for example. However, the hydraulic pump and the one-way clutches may be disposed on an axis different from axes of the pump-drive rotary shafts, such that the hydraulic pump and the one-way clutches are connected to the pump-drive rotary shafts through transmission mechanisms such as gears and chain belts. The pump shaft of the hydraulic pump is axially inserted in connection holes provided in the respective one-way clutches, for example, and is fixedly connected to the one-way clutches through splines, keys, two parallel surfaces (provided on an outer circumferential surface of the pump shaft) or other means for preventing rotation of the pump shaft relative to the one-way clutches. However, the pump shaft may be fixedly connected to the one-way clutches by fixing means such as press-fitting and welding. The connection of each of the pump-drive rotary shafts of the transmission mechanisms and a corresponding one of the one-way clutches may be made in substantially the same manner as the connection of the pump shaft and the one-way clutches.

EMBODIMENTS

There will be described embodiments of the present invention in details with reference to drawings. It is noted that figures of the drawings are simplified or deformed as needed, and each portion is not necessarily precisely depicted in terms of dimension ratio, shape, etc.

Figure 1:
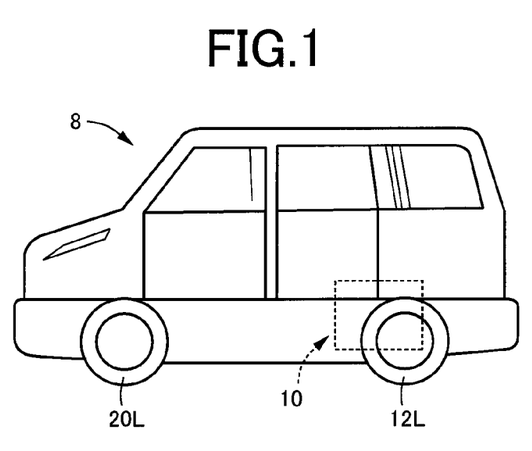
FIG. 1 is a left-side view schematically showing an electric vehicle, as seen from a left side of the vehicle, wherein the vehicle is provided with an electric drive unit as an embodiment of the present invention.
Figure 2:
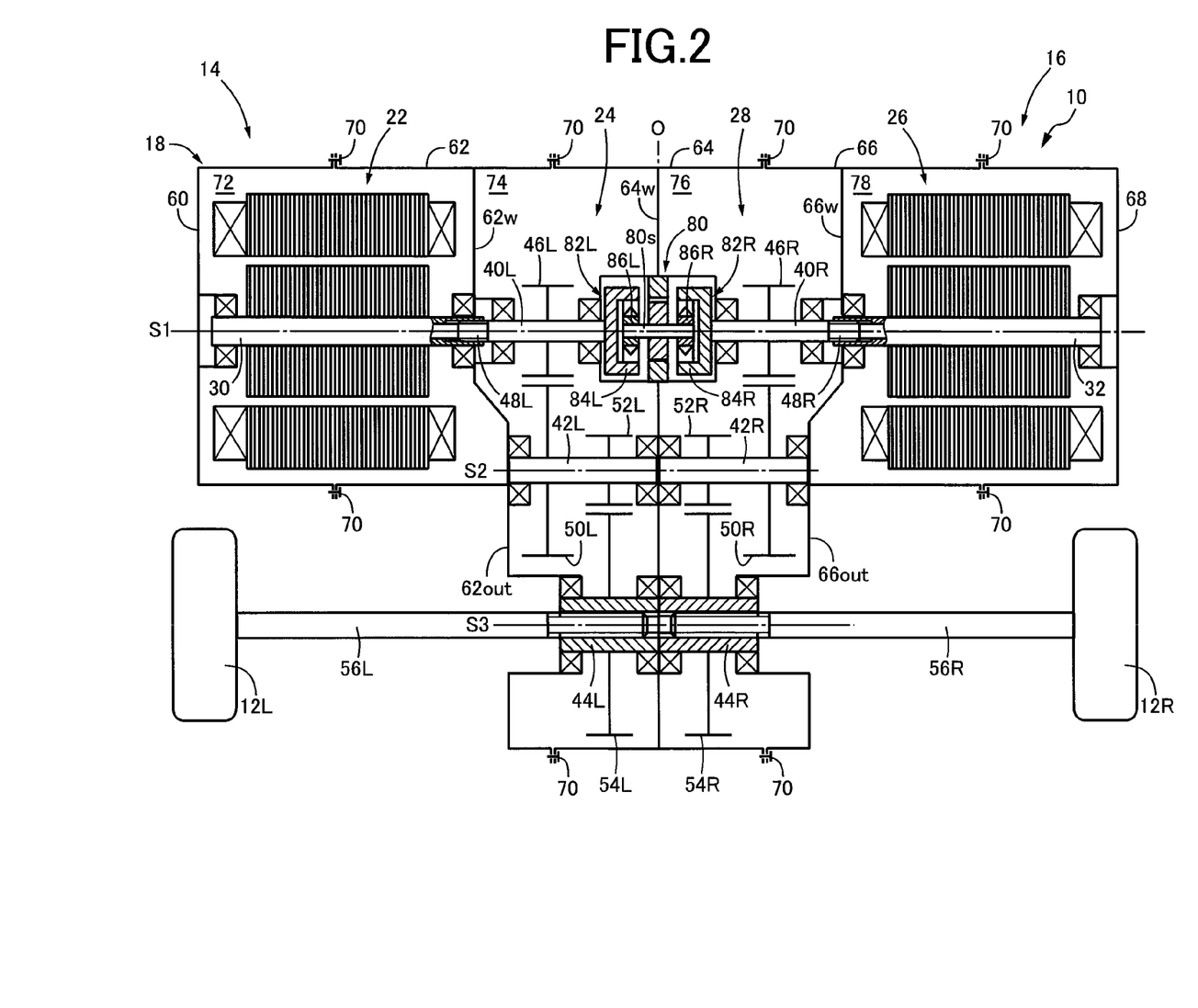
FIG. 2 is a view schematically showing a construction of the electric drive unit provided in the electric vehicle of FIG. 1, wherein the view is a cross-sectional view obtained by cutting the electric drive unit in a width direction of the vehicle and unfolding the cross-sectional view such that a plurality axes S1-S3 lie on a single plain.

FIG. 1 is a left-side view schematically showing an electric vehicle 8, as seen from a left side of the vehicle 8, wherein the vehicle 8 is provided with an electric drive apparatus in the form of an electric drive unit 10 that is an embodiment of the present invention. FIG. 2 is a view schematically showing a construction of the electric drive unit 10, wherein the view is a cross-sectional view obtained by cutting the electric drive unit 10 in a width direction of the vehicle 8 (hereinafter referred to as "vehicle width direction") and unfolding the cross-sectional view such that first through third axes S1-S3 lie on a single plain. The electric drive unit 10 is to be provided in a rear portion of the electric vehicle 8, so as to drive and rotate rear left and right wheels 12L, 12R. The electric drive unit 10 includes a left-side drive unit 14 configured to drive and rotate the rear left wheel 12L and a right-side drive unit 16 configured to drive and rotate the rear right wheel 12R. The left-side drive unit 14 and the right-side drive unit 16 are constructed symmetrically with each other with respect to a center line O in the vehicle width direction, and are disposed to be adjacent to each other in the vehicle width direction. The drive units 14, 16 are housed within a common casing 18. Although the electric vehicle 8 is driven to run, for example, with only an onboard battery serving as an electric power source, the electric vehicle 8 may be provided with an electric power generator such as fuel cell. The first through third axes S1-S3 are parallel to one another, and the electric drive unit 10 is disposed in the electric vehicle 8, to have an attitude that makes the first through third axes S1-S3 substantially parallel to the vehicle width direction. Although the electric vehicle 8 is a rear-wheel drive vehicle, the vehicle 8 may be a front-wheel drive vehicle with the electric drive unit 10 being arranged to drive and rotate front left and right wheels 20L, 20R.

The left-side drive unit 14 includes a left-side MG 22 as a left-side electric motor, and a gear train which is provided in a power transmission path between the left-side MG 22 and the rear left wheel 12L and which serves as a left-side transmission mechanism 24. Similarly, the right-side drive unit 16 includes a right-side MG 26 as a right-side electric motor, and a gear train which is provided in a power transmission path between the right-side MG 26 and the rear right wheel 12R and which serves as a right-side transmission mechanism 28. Each of the left-side MG 22 and the right-side MG 26 is a motor generator serving as an electric motor and also as an electric power generator. The left-side MG 22 and the right-side MG 26 are disposed transversely and spaced apart from each other in the vehicle width direction, such that their respective output shafts in the form of MG shafts 30, 32 are located on a common axis in the form of a first axis S1. Each of the left-side MG 22 and the right-side MG 26 is disposed to have an inward attitude that makes the MG shafts 30, 32 opposed to each other in the vehicle width direction. The left-side MG 22 and the right-side MG 26 are disposed symmetrically with each other with respect to the center line O. The left-side transmission mechanism 24 and the right-side transmission mechanism 28 are disposed to be adjacent to each other between the left-side MG 22 and the right-side MG 26 in the vehicle width direction. The left-side MG 22 and the right-side MG 26 are constituted by respective motor generators identical with each other and having the same standard, so that their respective rotors and stators are the same in axial length (stack thickness) and diameter. The left-side transmission mechanism 24 and the right-side transmission mechanism 28 serve as respective speed reducers configured to reduce speed at respective constant gear ratios that are equal to each other.

The left-side transmission mechanism 24 includes three left-side rotary shafts in the form of an input shaft 40L, an intermediate shaft 42L and an output shaft 44L. The right-side transmission mechanism 28 includes three right-side rotary shafts in the form of an input shaft 40R, an intermediate shaft 42R and an output shaft 44R. The input shafts 40L, 40R are both disposed on the first axis S1, and are provided with respective drive gears 46L, 46R and splines 48L, 48R. The input shaft 40L is connected through the spline 48L to the MG shaft 30 of the left-side MG 22 in a power transmittable manner. The input shaft 40R is connected through the spline 48R to the MG shaft 32 of the right-side MG 26 in a power transmittable manner. The intermediate shafts 42L, 42R are both disposed on a common axis in the form of a second axis S2 parallel to the first axis S1, and are provided with respective large-diameter gears 50L, 50R and small-diameter gears 52L, 52R. Each of the large-diameter gears 50L, 50R and a corresponding one of the small-diameter gears 52L, 52R are axially spaced apart from each other. Each of the large-diameter gears 50L, and a corresponding one of the drive gears 46L, 46R mesh with each other so as to transmit rotation therebetween. In the present embodiment, the small-diameter gears 52L, 52R and the large-diameter gears 50L, 50R are located in respective positions that are symmetrical with respect to the center line O, such that the small-diameter gears 52L, 52R are closer to the center line O in the vehicle width direction as compared with the large-diameter gears 50L, 50R that are located outside of the small-diameter gears 52L, 52R in the vehicle width direction. The output shafts 44L, 44R are both disposed on a common axis in the form of a third axis S3 parallel to the first axis S1. Each of the output shafts 44L, 44R is connected to a corresponding one of drive shafts 56L, 56R through splines or the like in a power transmittable manner. The output shafts 44L, 44R are provided with respective driven gears 54L, 54R that mesh with the respective small-diameter gears 52L, 52R so as to transmit rotation therebetween. Thus, rotations outputted from the respective left-side MG 22 and right-side MG 26 are reduced in speed by the respective left-side transmission mechanism 24 and right-side transmission mechanism 28 at the same gear ratio, and then are transmitted to the respective left and right drive shafts 56L, 56R, so that the rear left and right wheels 12L, 12R are driven and rotated at respective speeds that can be different from each other.

Constant-velocity joints or the like are provided between the output shafts 44L, 44R and the drive shafts 56L, 56R and between the drive shafts 56L, 56R and the rear wheels 12L, 12R, as needed. In the following description, the letters "L" and "R" after reference numerals are not provided unless left and right are to be distinguished from each other.

In the present embodiment, each of the left-side and right-side transmission mechanisms 24, 28 includes the third rotary shafts 40, 42, 44 and the four gears 46, 50, 52, 54. The left-side and right-side transmission mechanisms 24, 28 are constructed symmetrically with each other with respect to the center line O. Each of the four gears 46L, 50L, 52L, 54L (i.e., the drive gear 46L, large-diameter gear 50L, small-diameter gear 52L and driven gear 54L) of the left-side transmission mechanism 24 and a corresponding one of the four gears 46R, 50R, 52R, 54R (i.e., the drive gear 46R, large-diameter gear 50R, small-diameter gear 52R and driven gear 54R) of the right-side transmission mechanism 28 are disposed symmetrically with respect to the center line O, and have the same standard so as to be the same, for example, in number of teeth and pitch. However, the drive gears 46L, 46R, large-diameter gear 50L, 50R, small-diameter gear 52L, 52R and driven gear 54L, 54R are all helical gears each having a tooth form generated on a helical path about its axis, and the four gears 46L, 50L, 52L, 54L of the left-side transmission mechanism 24 are opposite in direction of the helical path to the four gears 46R, 50R, 52R, 54R of the right-side transmission mechanism 28. Further, each of the three rotary shafts 40L, 42L, 44L (i.e., the input shaft 40L, intermediate shaft 42L and output shaft 44L) of the left-side transmission mechanism 24 and a corresponding one of the three rotary shafts 40R, 42R, 44R (i.e., the input shaft 40R, intermediate shaft 42R and output shaft 44R) are to be rotated basically at the same speed during straight running of the electric vehicle 8.

The casing 18 is sectioned into a plurality of spaces that are arranged in the vehicle width direction, and is constituted by five casing members 60, 62, 64, 66, 68. Each adjacent pair of the five casing members 60, 62, 64, 66, 68 are in contact in their outer peripheral end portions with each other, and are fixed to each other by a plurality of bolts 70. Each of the bolts 70 is provided to extend substantially in the vehicle width direction, i.e., in a direction parallel to the axes S1-S3, and is screwed in an internal thread or a nut member provided in the casing members 60, 62, 64, 66, so as to integrally fix the casing members 60, 62, 64, 66, 68 to one another. Further, the casing members 62, 64, 66, which are intermediate three among the five casing members 60, 62, 64, 66, 68, are provided integrally with respective partition walls 62w, 64w, 66w that extend inwardly in a direction substantially perpendicular to the axes S1-S3, such that four housing spaces 72, 74, 76, 78 are defined by cooperation of the casing members 60, 62, 64, 66, 68 and the partition walls 62w, 64w, 66w. The left-side MG 22, left-side transmission mechanism 24, right-side transmission mechanism 28 and right-side MG 26 are disposed in the four housing spaces 72, 74, 76, 78, respectively. For cooling the MG 22 and MG 26 and lubricating the gears 46, 50, 52, 54 and bearings, lubricant oil is supplied to the housing spaces 72, 74, 76, 78 through lubrication circuit (not shown). The housing spaces 72, 74, 76, 78 are held in communication with one another through cutouts, communication holes or the like, so that the lubricant oil can be distributed.

The electric drive unit 10 includes a single hydraulic pump (oil pump) 80 serving as a hydraulic pressure source of the above-described lubrication circuit. The hydraulic pump 80 is an internal gear pump including an inner rotor and an outer rotor, and is configured to output hydraulic pressure with the inner rotor being driven and rotated. The hydraulic pump 80 includes a pump shaft 80s that is to be rotated integrally with the inner rotor. The pump shaft 80s is located on the first axis S1 and extends horizontally between the left and right input shafts 40L, 40R, such that the pump shaft 80s is to be driven and rotated by the input shafts 40L, 40R. Among the three rotary shafts 40, 42, 44 of each of the left-side and right-side transmission mechanisms 24, 28, the input shaft 40 provided with the single drive gear 46 is a short rotary shaft that is relatively short and is shorter in axial length than at least one of the other shafts 42, 44. The large-diameter gear 50, which is disposed on the intermediate shaft 42 and which meshes with the drive gear 46, is located in a position outwardly distant from the center line O in the vehicle width direction, so that it is possible to obtain a sufficient space in which the hydraulic pump 80, for example, is to be disposed, between the left and right input shafts 40L, 40R while suppressing increase of required dimension in the vehicle width direction. In the present embodiment, the input shafts 40L, 40R correspond to "pump-drive rotary shafts" recited in the appended claims.

The pump shaft 80s of the hydraulic pump 80 protrudes leftward and rightward, and the left-side and right-side one-way clutches 82L, 82R are disposed on left and right sides of the hydraulic pump 80, such that rotation is transmittable from each of the input shafts input shafts 40L, 40R to the pump shaft 80s through a corresponding one of the one-way clutches 82L, 82R. Each of the one-way clutches 82L, 82R, which are arranged symmetrically, is of roller-type including a corresponding one of outer races 84L, 84R and a corresponding one of inner races 86L, 86R, and configured to transmit power in one direction. In the present embodiment, the input shafts 40L, 40R are fixed integrally to the respective outer races 84L, 84R, and are to be driven and rotated. Meanwhile, the pump shaft 80s is connected at its axially opposite end portions to the inner races 86L, 86R in a power transmittable manner. Each of the one-way clutches 82L, 82R is configured to transmit rotation of a corresponding one of the input shafts 40L, 40R to the pump shaft 80s during forward running of the vehicle 8, so that the pump shaft 80s is driven and rotated by the input shafts 40L, 40R whereby the hydraulic pressure is outputted from the hydraulic pump 80. That is, the rotation is transmitted from one of the input shafts 40L, 40R, which is rotated at a speed higher than the other of the input shafts 40L, 40R, to the pump shaft 80s through a corresponding one of the one-way clutches 82L, 82R, while the rotation of the other of the input shafts 40L, 40R, which is rotated at a speed lower than the one of the input shafts 40L, 40R, is not transmitted to the pump shaft 80s with the other of the one-way clutches 82L, 82R being idled. In this instance, in the above-described corresponding one of the one-way clutches 82L, 82R, a corresponding one of the outer races 84L, 84R is inhibited from being rotated relative to a corresponding one of the inner races 86L, 86R in one of opposite directions, so that the rotation is transmitted through the above-described corresponding one of the one-way clutches 82L, 82R. Meanwhile, in the above-described other of the one-way clutches 82L, 82R, the other of the outer races 84L, 84R is allowed to be rotated relative to the other of the inner races 86L, 86R in the other of the opposite directions, so that the rotation is not transmitted through the above-described other of the one-way clutches 82L, 82R. Thus, when one of the input shafts 40L, 40R is rotated at a speed higher than the other of the input shafts 40L, 40R, for example, upon turning of the vehicle 8, the pump shaft 80s is driven and rotated by the one of the input shafts 40L, 40R through a corresponding one of the one-way clutches 82L, 82R, while the other of the one-way clutches 82L, 82R of the other of the input shafts 40L, 40R, which is rotated at a speed lower than the above-described one of the input shafts 40L, 40R, is idled whereby the differential rotation is absorbed.

The hydraulic pump 80 can be disposed in a pump housing hole that is provided in, for example, the partition wall 64w between the housing spaces 74, 76, so that the partition wall 64w constitutes a part of a pump casing of the hydraulic pump 80. The hydraulic pump 80 is configured to suck the lubricant oil through a suction passage provided in the partition wall 64w, and to supply the lubricant oil to various parts to be lubricated, through a supply passage provided in the partition wall 64w. The lubrication circuit can be constituted by using piping such as pipes, as needed. Further, the pump shaft 80s of the hydraulic pump 80, which protrudes leftward and rightward and which is connected to the inner races 86L, 86R of the respective one-way clutches 82L, 82R, has a diameter smaller than the inner races 86L, 86R, and is axially inserted in connection holes provided in the respective inner races 86L, 86R so as to be connected to the inner races 86L, 86R through splines (or other means for preventing rotation of the pump shaft 80s relative to the inner races 86L, 86R) in a power transmittable manner.

In the electric drive unit 10 constructed as described above, the hydraulic pump 80 is connected through the respective one-way clutches 82L, 82R to the input shafts 40L, 40R of the respective left-side and right-side drive units 14, 16, such that the hydraulic pump 80 is to be driven by one of the input shafts 40L, 40R that is rotated at a speed higher than the other of the input shafts 40L, 40R, so as to output the hydraulic pressure. Therefore, even when the left and right wheels 12L, 12R are rotated at respective different speeds, for example, upon turning of the vehicle 8, the lubricant oil can be always supplied by sufficient amount, and the single hydraulic pump 80 is commonly provided for the left-side and right-side drive units 14, 16, so that the electric drive unit 10 as a whole can be made compact in size whereby mountability of the electric drive unit 10 in the vehicle 8 is increased.

Further, the left-side transmission mechanism 24 and the right-side transmission mechanism 28 are symmetrical with each other with respect to the center line O in the vehicle width direction. Each of the left-side rotary shafts 40L, 42L, 44L and a corresponding one of the right-side rotary shafts 40R, 42R, 44R are disposed on a common axis, and are to be rotated at respective speeds equal to each other during straight running of the vehicle 8. The input shaft 40L as one of the left-side rotary shafts 40L, 42L, 44L and the input shaft 40R as one of the right-side rotary shafts 40R, 42R, 44R, which constitute the pump-drive rotary shafts, are disposed on the first axis S1 as the common axis. The hydraulic pump 80 and the one-way clutches 82L, 82R, which are disposed on respective opposite sides of the hydraulic pump 80 in the vehicle width direction, are located between the left-side transmission mechanism 24 and the right-side transmission mechanism 28 in the vehicle width direction, and disposed on the same axis as the input shafts 40L, 40R constituting the pump-drive rotary shafts. Thus, even when the left and right wheels 12L, 12R are rotated at respective different speeds, the lubricant oil can be supplied appropriately, and the electric drive unit 10 as a whole can be advantageously made compact in size. Particularly, since each of the input shafts 40L, 40R constituting the pump-drive rotary shafts is provided with only the one drive gear 46L or 46R, the required dimension in the vehicle width direction can be made small so that electric drive unit 10 can be made further compact in size.

Further, the short rotary shafts, which are the input shafts 40L, 40R as ones of the rotary shafts 40L, 40R, 42L, 42R, 44L, 44R of the left-side and right-side transmission mechanisms 24, 28 and which are relatively short in length, constitute the pump-drive rotary shafts. Therefore, for example, with the hydraulic pump 80 and the pair of one-way clutches 82L, 82R being disposed between the input shafts 40L, 40R, the dimension of the electric drive unit 10 in the vehicle width direction can be made small.

Further, the left-side and right-side drive units 14, 16 are disposed inside the common casing 18 such that the left-side and right-side transmission mechanisms 24, 26 are disposed on respective opposite sides of the partition wall 64w, wherein the hydraulic pump 80 is fixed to the partition wall 64w such that at least a part of the pump casing of the hydraulic pump 80 is constituted by the partition wall 64w. Thus, the dimension of the electric drive unit 10 in the width direction of the vehicle can be made further small.

Further, the one-way clutches 82L, 82R are disposed on respective opposite sides of the hydraulic pump 80 in the vehicle width direction, wherein the outer races 84L, 84R of the respective one-way clutches 82L, 82R are connected to the respective input shafts 40L, 40R, and wherein the inner races 86L, 86R of the respective one-way clutches 82L, 82R are connected to the respective axially opposite end portions of the pump shaft 80s that protrudes leftward and rightward, with the axially opposite end portions of the pump shaft 80s being axially inserted in the connection holes provided in the respective inner races 86L, 86R of the respective one-way clutches 82L, 82R. Thus, the connection of the pump shaft 80s to the one-way clutches 82L, 82R can be easily made.

There will be described other embodiments of this invention. The same reference signs as used in the above-described embodiment will be used in the following embodiments, to identify the practically corresponding elements, and descriptions thereof are not provided.

Figure 3:
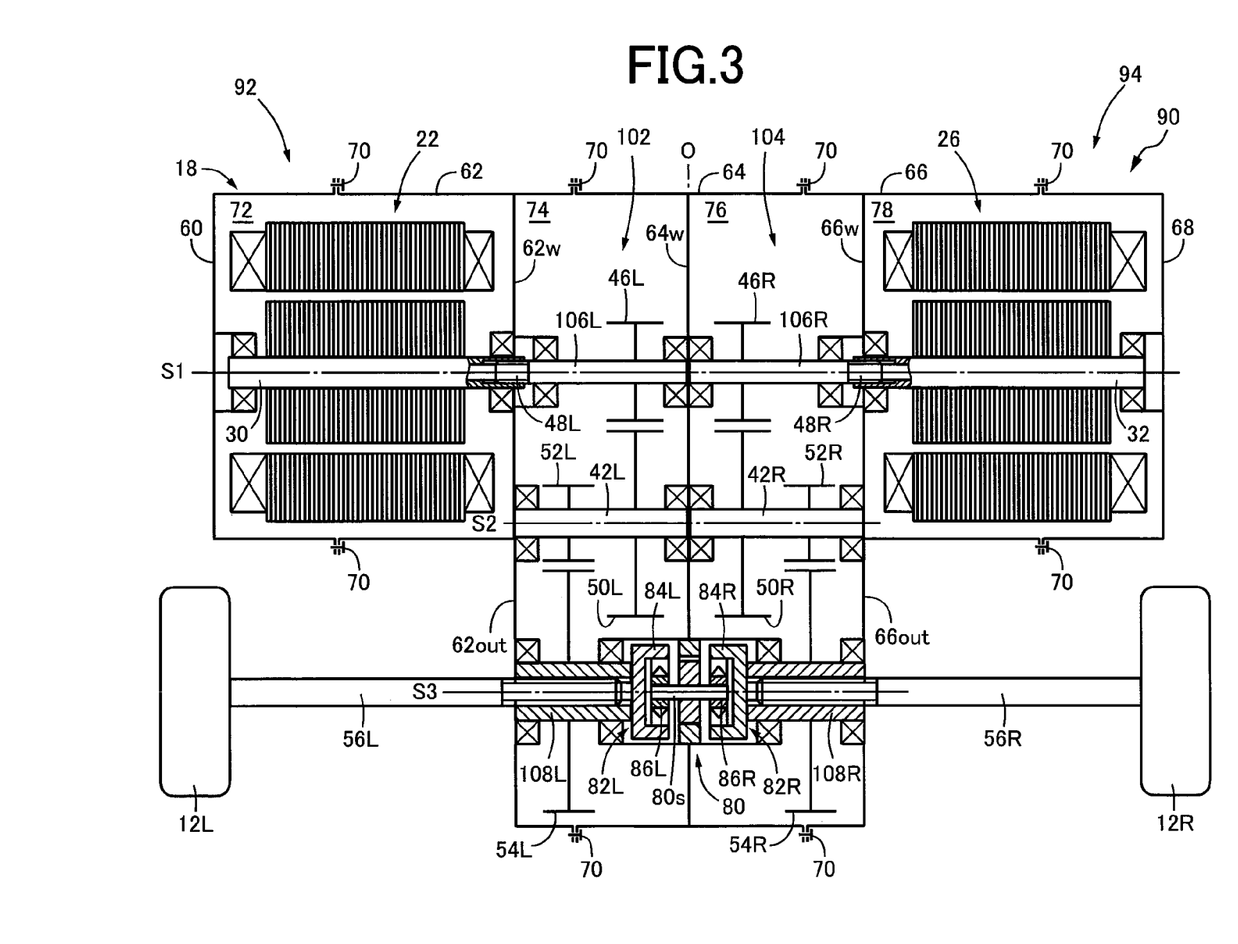
FIG. 3 is a view corresponding to the view of FIG. 2, and schematically showing a construction of an electric drive unit as another embodiment of the present invention.

FIG. 3 shows an electric drive unit 90 that is another embodiment of the present invention. In the electric drive unit 90, a left-side transmission mechanism 102 of a left-side drive unit 92 and a right-side transmission mechanism 104 of a right-side drive unit 94 are different from the left-side transmission mechanism 24 and the right-side transmission mechanism 28 in the electric drive unit 10 that is the above-described embodiment. That is, each of the left-side and right-side transmission mechanisms 102, 104 is laterally inverted as compared with a corresponding one of the left-side and the right-side transmission mechanisms 24, 28, such that the large-diameter gear 50 disposed on the intermediate shaft 42 is located in a position close to the center line O in the vehicle width direction, and such that the small-diameter gear 52 disposed on the intermediate shaft 42 is located in a position outwardly distant from the center line O in the vehicle width direction. Therefore, left and right output shafts 108L, 108R, each of which is provided with the driven gear 54 meshing with the small-diameter gear 52, can be disposed to be distant from the center line O in the vehicle width direction. Thus, in the present embodiment, between the left and right output shafts 108L, 108R, the single hydraulic pump 80 and the pair of one-way clutches 82L, 82R are disposed, such that the pump shaft 80s is rotatable by the output shafts 108L, 108R through the respective one-way clutches 82L, 82R during forward running of the vehicle 8. In the present embodiment, each of the output shafts 108L, 108R, which is provided with the single driven gear 54, is a short rotary shaft that is shorter in axial length than the other shafts 42, 106, and the output shafts 108L, 108R correspond to "pump-drive rotary shafts" recited in the appended claims. It is noted that the left and right input shafts 106L, 106R, which are provided with the drive gears 46L, 46R each meshing with the large-diameter gear 50 located in the position close to the center line O, are longer than the input shafts 40L, 40R in the above-described embodiment, so that that the input shafts 106L, 106R can be connected through the respective splines 48L, 48R to the respective MG shafts 30, 32 in a power transmittable manner.

In the present embodiment, the single hydraulic pump 80 as well as the pair of one-way clutches 82L, 82R is disposed between the left and right output shafts 108L, 108R that are disposed to be distant from the center line O, such that the hydraulic pump 80 is to be driven by one of the output shafts 108L, 108R that is rotated at a speed higher than the other of the output shafts 108L, 108R, so as to output the hydraulic pressure. Therefore, in the present embodiment, too, even when the left and right wheels 12L, 12R are rotated at respective different speeds, for example, upon turning of the vehicle 8, the lubricant oil can be supplied by sufficient amount, and the single hydraulic pump 80 is commonly provided for the left-side and right-side drive units 92, 94, so that it is possible to obtain substantially the same effects as in the above-described embodiment, such as the effect that the electric drive unit 90 as a whole can be made compact in size. However, since rotational speeds of the output shafts 108L, 108R are lower than those of the input shafts 106L, 106R, depending on the gear ratios of the transmission mechanisms 102, 104, the hydraulic pump 80 may be constituted by a hydraulic pump having an output capacity that is increased by an amount corresponding to the reduction of the rotational speeds.

Figure 4:
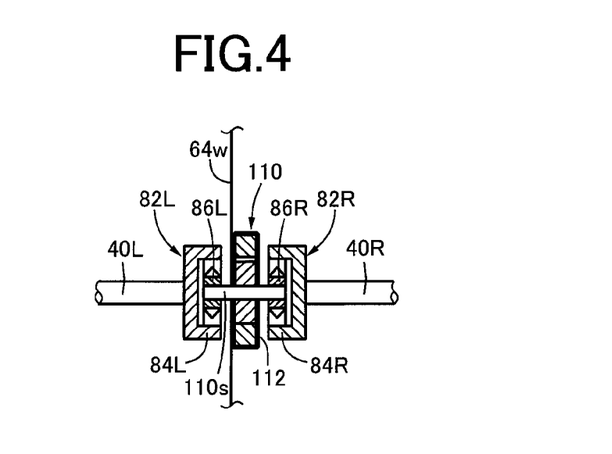
FIG. 4 is a view showing still another embodiment of the present invention, wherein the view is a cross-sectional view of a hydraulic pump and a pair of one-way clutches.

FIG. 4 is a view showing still another embodiment of the present invention, wherein a single hydraulic pump (oil pump) 110 includes a pump casing 112 in which inner and outer rotors are rotatably housed, so as to serve as a pump by itself. In the present embodiment, the hydraulic pump 110 is fixed on one of opposite side wall surfaces of the partition wall 64w, specifically, on a side wall surface of the partition wall 64w that faces the right-side transmission mechanism 28. The hydraulic pump 110 includes a pump shaft 110s protruding leftward and rightward, such that the pump shaft 110s is connected at its right-side end portion to the inner race 86R of the right-side one-way clutch 82R through a spline (or other means for preventing rotation of the pump shaft 110s relative to the inner races 86R) in a power transmittable manner, as in the above-described embodiments, and such that the pump shaft 110s is connected at its left-side end portion to the inner race 86L of the left-side one-way clutch 82L through a spline (or other means for preventing rotation of the pump shaft 110s relative to the inner races 86L) in a power transmittable manner, wherein the left-side end portion of the pump shaft 110s passes through a through-hole provided in the partition wall 64w. In the present embodiment, too, the hydraulic pump 110 is configured to suck the lubricant oil through the suction passage provided in the partition wall 64w, and to supply the lubricant oil to various parts to be lubricated, through the supply passage provided in the partition wall 64w. It is also possible to provide pipes as suction and supply piping, to inlet and outlet ports of the hydraulic pump 110.

In the present embodiment, the hydraulic pump 110 is fixed on one of opposite side wall surfaces of the partition wall 64w, so that the required dimension in the vehicle width direction is larger than in the above-described embodiments. However, since the hydraulic pump 110, which is already provided with the pump casing 112, can be attached to the partition wall 64w, the assembling operation can be made easier. It is noted that, in the embodiments shown in FIGS. 2 and 3, too, the hydraulic pump 110 shown in FIG. 4 can be used in place of the hydraulic pump 80.

Figure 5:
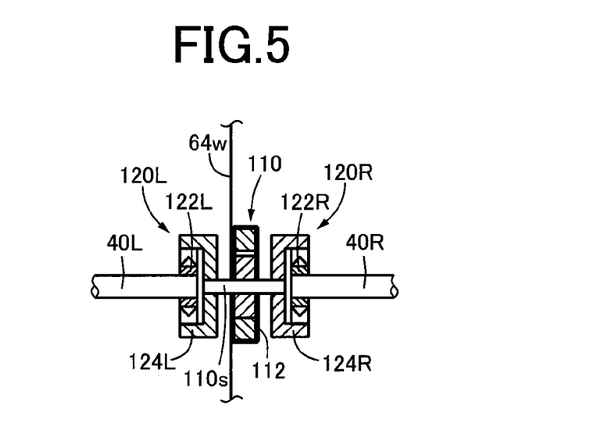
FIG. 5 is a view showing still another embodiment of the present invention, wherein the view is a cross-sectional view of the hydraulic pump and a pair of one-way clutches.

FIG. 5 shows still another embodiment in which each of a pair of one-way clutches 120L, 120R is laterally inverted as compared with a corresponding one of the pair of one-way clutches 82L, 82R in the embodiment of FIG. 4, such that the input shafts 40L, 40R are axially inserted in respective connection holes provided in respective inner races 122L, 122R of the respective one-way clutches 120L, 120R, so as to be connected to the inner races 122L, 122R through splines (or other means for preventing rotations of the input shafts 40L, 40R relative to the inner races 122L, 122R) in a power transmittable manner, and such that the pump shaft 110s is axially inserted in connection holes provided in the respective outer races 124L, 124R of the respective one-way clutches 120L, 120R, so as to be connected to the outer races 124L, 124R through splines (or other means for preventing rotation of the pump shaft 110s relative to the outer races 124L, 124R) in a power transmittable manner. In the present embodiment, it is possible to obtain substantially the same effects as in the above-described embodiment of FIG. 4. It is noted that, in the embodiments shown in FIGS. 2 and 3, too, the one-way clutches 120L, 120R shown in FIG. 5 can be used in place of the one-way clutches 82L, 82R. Moreover, the one-way clutch 82L may be used together with the one-way clutch 120R, or the one-way clutch 82R may be used together with the one-way clutch 120L.

It is to be understood that the embodiments described above are given for illustrative purpose only, and that the present invention may be embodied with various modifications and improvements which may occur to those skilled in the art.

NOMENCLATURE OF ELEMENTS

10; 90: electric drive unit (electric drive apparatus)
12L: rear left wheel (left wheel)
12R: rear right wheel (right wheel)
14; 92: left-side drive unit
16; 94: right-side drive unit
18: casing
22: left-side MG (left-side electric motor)
24; 102: left-side transmission mechanism
26: right-side MG (right-side electric motor)
28; 104: right-side transmission mechanism
32: MG shaft (output shaft)
40R: input shaft (rotary shaft, short rotary shaft, pump-drive rotary shaft)
42L, 42R: intermediate shaft (rotary shaft)
44L, 44R: output shaft (rotary shaft)
46L, 46R: drive gear (gear)
50R: large-diameter gear (gear)
52L, 52R: small-diameter gear (gear)
54L, 54R: driven gear (gear)
56L, 56R: drive shaft
64w: partition wall
110: hydraulic pump
110s: pump shaft
82L, 82R; 120L, 120R: one-way clutch
84L, 84R; 124L, 124R: outer race
86L, 86R; 122L, 122R: inner race
106L, 106R: input shaft (rotary shaft)
108L, 108R: output shaft (rotary shaft, short rotary shaft, pump-drive rotary shaft)
S1: first axis
S2: second axis
S3: third axis

What is claimed is:

1. An electric drive apparatus for a vehicle, the electric drive apparatus comprising:
   (a) a left-side drive unit configured to drive a left wheel of the vehicle, and including (a-1) a left-side electric motor and (a-2) a left-side transmission mechanism including left-side rotary shafts and disposed in a left-side power transmission path between the left-side electric motor and the left wheel;
   (b) a right-side drive unit configured to drive a right wheel of the vehicle, and including (b-1) a right-side electric motor and (b-2) a right-side transmission mechanism including right-side rotary shafts and disposed in a right-side power transmission path between the right-side electric motor and the right wheel; and
   (c) a single hydraulic pump configured to output a hydraulic pressure,
   wherein one of the left-side rotary shafts and one of the right-side rotary shafts constitute a pair of pump-drive rotary shafts that are to be rotated at respective speeds equal to each other during straight running of the vehicle, and
   wherein the single hydraulic pump is connected to the pair of pump-drive rotary shafts through respective one-way clutches, and is to be driven by one of the pump-drive rotary shafts that is rotated at a speed higher than the other of the pump-drive rotary shafts, so as to output the hydraulic pressure.

2. The electric drive apparatus according to claim 1,
   wherein the left-side rotary shafts and the right-side rotary shafts are the same as each other in number, and extend substantially in parallel to a width direction of the vehicle,
   wherein the left-side transmission mechanism and the right-side transmission mechanism are the same as each other in gear ratio and in number of gears disposed on the rotary shafts, and are symmetrical with each other with respect to a center line in the width direction of the vehicle,
   wherein each of the left-side rotary shafts and a corresponding one of the right-side rotary shafts are disposed on a common axis, and are to be rotated at respective speeds equal to each other during straight running of the vehicle,
   wherein the one of the left-side rotary shafts and the one of the right-side rotary shafts, which constitute the pair of pump-drive rotary shafts, are disposed on the common axis, and
   wherein the single hydraulic pump and the one-way clutches, which are disposed on respective opposite sides of the single hydraulic pump in the width direction of the vehicle, are located between the left-side transmission mechanism and the right-side transmission mechanism in the width direction, and disposed on the same axis as the pair of pump-drive rotary shafts.

3. The electric drive apparatus according to claim 2,
   wherein the left-side electric motor and the right-side electric motor are disposed to be spaced apart from each other in a direction of a first axis as the same axis that is substantially parallel to the width direction of the vehicle, and have respective output shafts that are located on the first axis,
   wherein the left-side transmission mechanism and the right-side transmission mechanism are located between the left-side electric motor and the right-side electric motor in the width direction,
   wherein the left-side rotary shafts include an input shaft, an intermediate shaft and an output shaft, while the right-side rotary shafts include an input shaft, an intermediate shaft and an output shaft,
   wherein the gears disposed on the left-side rotary shafts include a drive gear, a large-diameter gear, a small-diameter gear and a driven gear, while the gears disposed on the right-side rotary shafts include a drive gear drive gear, a large-diameter gear, a small-diameter gear and a driven gear,
   wherein the drive gear is disposed on the input shaft of each of the left-side transmission mechanism and the right-side transmission mechanism, which is located on the first axis,
   wherein the input shaft of the left-side transmission mechanism is connected to the left-side electric motor in a power transmittable manner while the input shaft of the right-side transmission mechanism is connected to the right-side electric motor in a power transmittable manner,
   wherein the large-diameter gear and the small-diameter gear are disposed on the intermediate shaft of each of the left-side transmission mechanism and the right-side transmission mechanism, which is located on a second axis parallel to the first axis, such that the large-diameter gear and the small-diameter gear are spaced apart from each other in a direction of the second axis, and such that rotation is transmittable to the large-diameter gear from the drive gear disposed on the input shaft,
wherein the driven gear is disposed on the output shaft of each of the left-side transmission mechanism and the right-side transmission mechanism, which is located on a third axis parallel to the first axis, and which is connected to a drive shaft in a power transmittable manner, such that rotation is transmittable to the driven gear from the small-diameter gear disposed on the intermediate shaft, and
wherein one of the input shaft and the output shaft of each of the left-side transmission mechanism and the right-side transmission mechanism constitutes a corresponding one of the pair of pump-drive rotary shafts.

4. The electric drive apparatus according to claim 1,
wherein the one of the left-side rotary shafts, which constitutes one of the pair of pump-drive rotary shafts, is shorter in length than at least one of the other of the left-side rotary shafts, and
wherein the one of the right-side rotary shafts, which constitutes the other of the pair of pump-drive rotary shafts, is shorter in length than at least one of the other of the right-side rotary shafts.

5. The electric drive apparatus according to claim 1,
wherein the left-side drive unit and the right-side drive unit are disposed inside a common casing that is provided with a partition wall, such that the left-side transmission mechanism and the right-side transmission mechanism are disposed on respective opposite sides of the partition wall, and
wherein the single hydraulic pump is fixed to the partition wall such that at least a part of a pump casing of the single hydraulic pump is constituted by the partition wall.

6. The electric drive apparatus according to claim 1,
wherein the single hydraulic pump includes a pump shaft, and is configured to output the hydraulic pressure with the pump shaft being rotated,
wherein the one-way clutches are disposed on respective opposite sides of the single hydraulic pump in a width direction of the vehicle, and each of the one-way clutches includes an inner race and an outer race,
wherein one of the outer race and the inner race of each of the one-way clutches is connected to a corresponding one of the pair of pump-drive rotary shafts, and
wherein the other of the outer race and the inner race of each of the one-way clutches is connected to a corresponding one of axially opposite end portions of the pump shaft, with the corresponding one of the axially opposite end portions of the pump shaft being inserted in a connection hole provided in the other of the outer race and the inner race of the each of the one-way clutches.

* * * * *